United States Patent [19]

Hatfield

[11] Patent Number: 5,005,527

[45] Date of Patent: Apr. 9, 1991

[54] UNITARY ANIMAL LEASH AND COLLAR

[76] Inventor: Charles S. Hatfield, 3203 S. Walton Blvd., Bentonville, Ark. 72712

[21] Appl. No.: 479,162

[22] Filed: Feb. 13, 1990

[51] Int. Cl.$^5$ ............................................. A01K 27/00
[52] U.S. Cl. ................................... 119/109; 119/106; 24/170
[58] Field of Search ............... 119/109, 106, 110, 96; 24/170, 191, 193

[56] References Cited

U.S. PATENT DOCUMENTS

| 939,902 | 11/1909 | Garrison | 24/170 |
|---|---|---|---|
| 4,270,491 | 6/1981 | Cox | 119/109 |
| 4,398,500 | 8/1983 | Koronkiewicz | 119/109 |
| 4,584,967 | 4/1986 | Taphin | 119/109 |
| 4,787,340 | 10/1988 | Kirtley | 119/109 |
| 4,881,303 | 11/1989 | Martini | 24/170 |

FOREIGN PATENT DOCUMENTS

| 26068 | 5/1930 | Australia | 119/109 |
|---|---|---|---|
| 2423175 | 12/1979 | France | 24/170 |
| 7709183 | 1/1979 | Netherlands | 119/106 |
| 39036 | 2/1922 | Norway | 24/170 |
| 859856 | 9/1959 | United Kingdom | 119/109 |
| 2109215 | 6/1983 | United Kingdom | 119/106 |

Primary Examiner—John G. Weiss
Attorney, Agent, or Firm—N. J. Aquilino; J. L. Welsh

[57] ABSTRACT

A one-piece animal leash having an adjustable collar. The leash, including an elongated strap, with the collar end terminating in a clamp member and D-ring. The strap passes through the D-ring and clamp member to form an adjustable loop which can be expanded or contracted, and locked infinitely along the length of the strap in order to fit animals of all sizes.

10 Claims, 1 Drawing Sheet

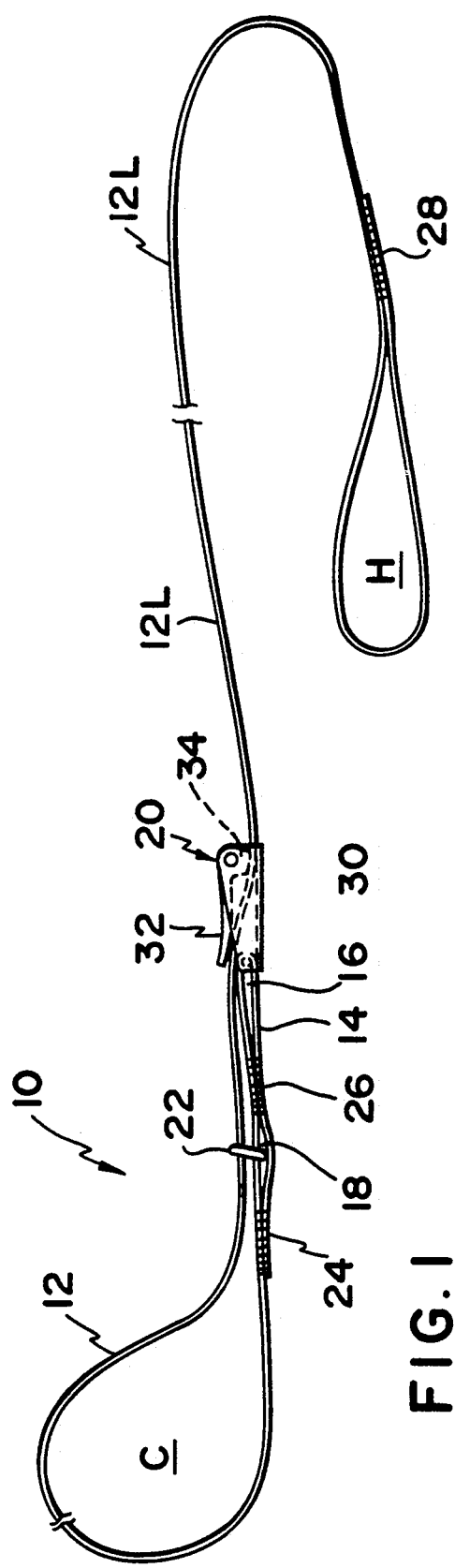
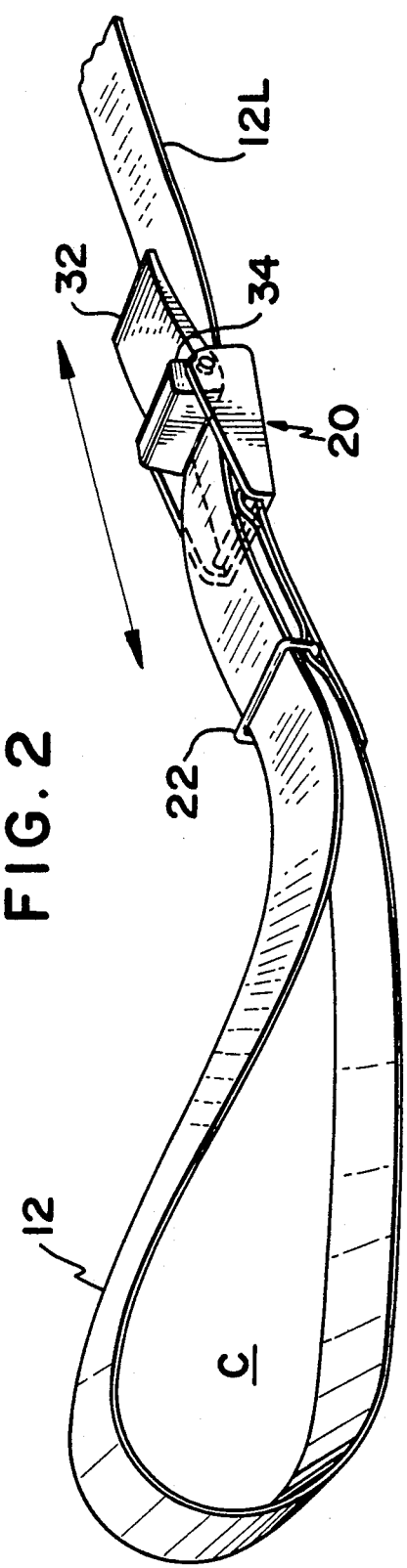

UNITARY ANIMAL LEASH AND COLLAR

BACKGROUND OF THE INVENTION

The present invention relates to leashes for pets, and more particularly to an infinitely adjustable collar for a pet leash which permits its use with animals of all sizes.

There is a wide variety of leashes known in the prior art wherein the collar is integrally formed with the lead portion of the leash. The common problem with these known leashes for animals is that they do not provide a precise collar size to accommodate the individual characteristics of the animal being held. For example, some leashes provide a slip loop, which engages the animal's neck so that the loop will tighten and choke the animal, to keep the animal under control. However, often the choking action is excessive, and the animal may be injured. Other adjustments are complicated and/or difficult to secure; for example, where a strap and buckle is required to be fastened. Fasteners of these type seldom provide a precise collar size for a particular animal.

The prior art includes a number of patents directed to various types of adjustable animal leash structures. For example, the Australian patent to Masters 26,068 in which the adjustment means is cumbersome, and not easily adjustable; thus, making it extremely difficult to put the leash on an uncooperative animal. Other patents of interest relating to animal leashes and the like have been granted to Cox 4,270,491, Taplin 4,584,967, Kirtly 4,787,340; and in Great Britain, patent 859,856 to Newgass.

SUMMARY OF THE INVENTION

The present invention is an animal leash including an elongated strap having a quick release clamp and associated D-ring through which the strap passes to provide an infinitely adjustable collar size to accommodate animals of various sizes.

It is the main object of the present invention to provide a leash with a collar which is quick and simple to use.

It is another object to provide a leash with an infinitely adjustable collar in order to comfortably fit animals of all sizes.

BRIEF DESCRIPTION OF THE DRAWINGS

The figures in the drawings are briefly described as follows:

FIG. 1 is a side view of the leash and collar assembly.

FIG. 2 is a top plan view showing the adjustable collar portion in detail with the quick release clamp unlocked.

DESCRIPTION OF THE PREFERRED EMBODIMENTS

Referring to the drawings in detail, an animal leash 10 according to the invention includes a strap 12, made from any suitable material, such as leather, plastic, nylon, etc. One end of the strap 12 is folded back upon itself as indicated by folded portion 14, and is attached by two separate sewn spacer areas 24 and 26 so as to form two securing loops 16 and 18. The securing loop 16 functions to hold a quick release clamp 20 at the end of the strap. The securing loop 18 functions to secure a metal D-ring 22 spaced a short distance from the quick release clamp 20. The distance between the D-ring 22 and quick release clamp 20 formed by spacer 26 keeps the clamp 20 away from the neck of the animal. This distance keeps the clamp 20 from becoming tangled in the hair of the animal, and also makes the clamp 20 easily accessible the relative position of the D-ring 22 and the quick release clamp 20 is constantly maintained during the attachment of the collar to the animal by the double layer spacer 226, which is shown in FIG. 1.

The other end of the strap 12 is slidably looped through the D-ring 22, and continues through the quick release clamp 20, thereby forming an adjustable collar (C) which is designed to fit around the neck of the animal being held. The strap 12 extends from the quick release clamp 20 and continues, forming the leash portion 12L. The end of the leash portion 12L is folded over and attached to itself by stitching 28 forming a handle (H), which also prevents the end of the leash from sliding back through the quick release clamp 20.

The quick release clamp 20 includes a body 30 and a pivotal latch 32 with locking portion 34. The body 30 is comprised of a base 36 and two parallel side walls 38, perpendicular to the base 36 to accommodate the strap 12 which slides within the body. When the latch 32 is moved downwardly, the strap 12 is frictionally locked in place by locking portion 34, clamping the strap 12 against the base 36 of the clamp 20.

As shown in FIG. 2, the clamp 20 is shown in the open, unlocked position, and the strap 12 is free to slide through clamp 20 in either direction in order to increase or decrease the collar loop size. The use of the quick release clamp 20 in combination with the strap 12 allows the clamp 20 to be slid infinitely along the length of the strap 12. This important feature of being infinitely adjustable permits the collar to be adjusted to comfortably fit around the necks of animals of all sizes.

Also, the quick release clamp 20 allows this leash and collar assembly to be used on uncooperative animals. For example, the clamp 20 could be opened and slid in a first direction along the strap in order to form a large loop; then quickly put around the neck of an animal, and slid in a second direction until snug around the animal's neck. Once snug, the clamp 20 is locked, and the animal does not have time to resist the attachment of the leash.

The D-ring 22 functions to relieve the strain on the quick release clamp 20, thereby maintaining a positive lock which makes it difficult, if not impossible, for an animal to release itself.

It will be apparent to those skilled in the art that various modifications and variations may be made in the leash design described above without departing from the scope or spirit of the present invention as defined in the following claims.

I claim:

1. An animal leash comprising; an elongated strap with a quick release clamp secured at one end thereof, a rigid ring secured to the strap and spaced from the quick release, clamp, an infinitely adjustable collar formed from the other end of the strap slidably looped through the ring and then through the clamp, to form a loop for adjustably engaging the animal's neck, wherein the quick release clamp is infinitely slidable and lockable along the length of the strap.

2. The device of claim 1 wherein, said ring comprises a metal D-ring, and functions to relieve the strain on the quick release clamp.

3. The device of claim 1 wherein, said other end of the strap is attached to itself so as to form a hand engaging loop, whereby the hand engaging loop cannot pass through said quick release clamp.

4. The device of claim 1 wherein, the strap is made from nylon and the strap is attached to itself by sewn stitching.

5. An animal leash comprising; an elongated strap having a first end folded back upon itself and attached so as to form two spaced loops, the first loop securing a quick release clamp, the second loop securing a ring, and an infinitely adjustable collar formed from the second end of said strap slidably looped through said ring, continuing through said quick release clamp, wherein the quick release clamp can be slid and locked infinitely along the length of the strap in order to adjust the size of the collar.

6. The device of claim 5 wherein, said ring comprises a rigid D-ring, and functions to relieve the strain on the quick release clamp.

7. The device of claim 5 wherein, said second end of the strap is attached to itself so as to form a hand engaging loop, whereby the hand engaging loop cannot pass through said quick release clamp.

8. The device of claim 5 wherein, the strap is made from nylon and the strap is attached to itself by sewn stitching.

9. An animal leas comprising:
an elongated strap having a first end folded back upon itself and attached so as to form a double layer spacer between two spaced loops, the first loop securing a quick release clamp, the second loop securing a ring, said spacer maintaining a constant distance between said ring and said quick release clamp, and an infinitely adjustable collar formed from the second end of said strap slidably looped through said ring, continuing through said quick release clamp, wherein the quick release clamp can be slid and locked infinitely along the length of the strap in order to adjust the size of the collar during the attaching process and the relative position of said ring and said quick release clamp remains constant during the entire attaching process.

10. The device of claim 9 wherein, said ring comprises a rigid D-ring, and functions to relieve the strain on the quick release clamp.

* * * * *